April 29, 1952  K. A. FISCHER  2,594,756
POLARIZING AND OPTICALLY STAINING DARK FIELD MICROSCOPE
Filed May 13, 1948
Fig. 1
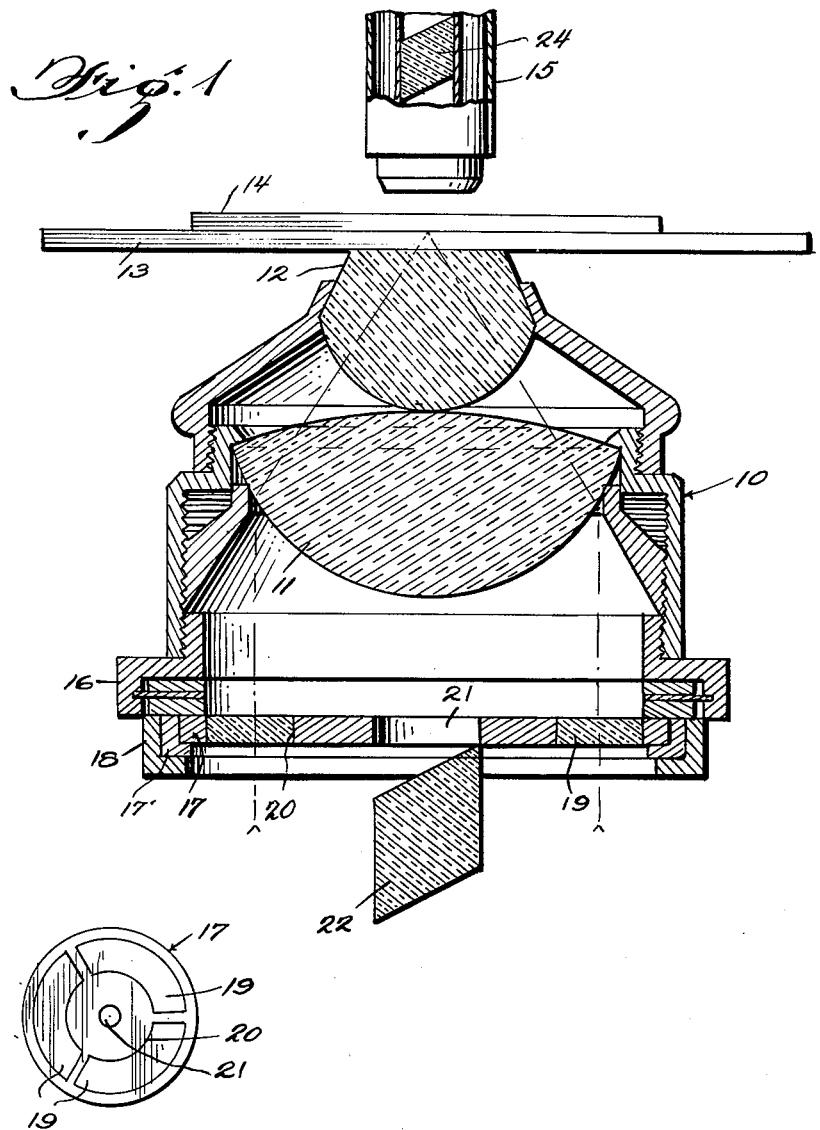
Fig. 2
INVENTOR.
Karl A Fischer
BY
W. J. Eccleston
ATTORNEY Patented Apr. 29, 1952

2,594,756

UNITED STATES PATENT OFFICE 2,594,756

POLARIZING AND OPTICALLY STAINING DARK FIELD MICROSCOPE

Karl A. Fischer, Washington, D. C.

Application May 13, 1948, Serial No. 26,911

2 Claims. (Cl. 88—40)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates to an improved microscope for facilitating the observation of crystalline structures and inclosures having double refractivity or which are in extinguishing position. More particularly, the invention concerns an improved microscope utilizing the combined use of a dark field and polarized light to examine thin transparent crystalline structure.

Heretofore, microscopic examination of crystals has been directed primarily towards examinations in polarized light which show doubly refracting crystals to a high degree of perfection, or otherwise to the use of a dark field examination alone. Satisfactory and complete analysis by dark field examination of thin crystals having strong or feeble double refractivity cannot be made in a conventional dark field microscope as cracks in the crystal body show brightly, simulating crystal boundaries. Likewise, the use of polarized light alone is not suitable for satisfactory examination of very delicate crystalline objects with poor double refractivity in that the steric structure of a crystal appears in one color without a clear disclosure of cracks and enclosures or imperfections therein. Further, while a color shade may indicate depth for only one crystal when several are compacted no clear line of demarcation can be determined and color shades can be misinterpreted, whereas with the combined effect of dark field and polarized light illumination crystal boundaries appear and imperfections are shown in definite and distinguishing coloring against the overall shade caused by the polarized light.

It is, therefore, an object of this invention to provide an improved microscope for the examination of thin transparent crystals to show optically active and inactive matter in different colors and reinforce underlying delicate boundaries, edges and fissures.

It is a further object of this invention to provide an improved microscope which facilitates observation of crystalline enclosures and of thin crystalline material with very feeble double refractivity or in extinguishing position.

Still a further object of this invention is to provide an improved means for microscopic examination of thin crystalline structure with very feeble double refractivity or which exist in extinguishing position by utilizing an improved diaphragm with a relatively simple and inexpensive microscope.

Other objects and advantages of the invention will be apparent from the following description when taken in connection with the accompanying drawings, in which, Figure 1 is a cross section view showing a diaphragm for use with dark field in combination with polarized light; and, Figure 2 is a top plan view of the diaphragm.

Referring to the drawings, a microscope condenser mounting 10 supports condenser lens 11 and condenser lens 12 in a conventional manner as disclosed in E. S. Bissell, Patent No. 2,083,820. Above the lens 12 rests a slide 13 on which is positioned a cover glass 14 or the like arranged in a conventional manner. Above the cover glass 14 is an adjustable eye piece 15 containing a conventional magnification lens (not shown) and analyzer 24.

At the base of the condenser mounting 10 the adjustable ring 16 holds a modified dark field diaphragm 17 in mounting ring 17' which is supported by the flange and body portion of support 18 in substantially the manner as illustrated in the above mentioned patent.

The modified dark field diaphragm 17 is provided with a colored transparent foil 19 about its outer periphery and its centrally disposed covered area 20 is provided with opening 21. For dark field illumination the foil 19 is composed of glass or the like which is colored a bright ruby red, yellow, green or blue, depending on the object to be examined in accordance with standards of microscopic examinations. The central opening 21 is of a size on the order of one to two millimeters diameter or larger depending upon the equipment, source of light and object to be examined.

Immediately in front of the opening 21 is positioned a polarizing nicol 22 which is adapted to pass polarized light substantially through the central portion of lens 11 and 12 and into the eye piece 15 and through analyzer nicol 24. If desired, the opening 21 may be provided with a polarizing foil as a substitute for nicol 22 and the eye piece 15 provided with a similar foil in crossed position as a substitute for nicol 24.

The condenser lens system 11, 12 is positioned intermediate the analyzer 24 on the one hand and the opaque annulus of diaphragm 17, annular color filter 19 and polarizer 22 on the other hand; all of the foregoing members are aligned on the same optical axis.

Conventional light is the source of the colored non-polarized light and of the polarized light. These lights, however, are used in combination to illuminate the object arranged under the microscope with the conical light component suitably derived from the iris diaphragm of an illuminating device and adapted to the polarized light component from the central opening. The object, when of a character in the nature of a wax crystal or the like, which is very thin and exists in substantially an extinguishing position is presented as a clear picture of the crystalline structure in space. With the illumination disclosed there is secured a very clear showing of the crystal depth, with the optically active and inactive matter shown in the diaphragm color and a distinct underlining of its delicate boundaries, edges and fissures.

More particularly the combination of polarized light and dark field illumination with low magnification, for example fifty times or slightly more, will suffice to show crystal thickness with entirely different color changes indicating when crystals lie above each other, thereby preventing cracks from appearing as crystal boundaries.

With apparatus as disclosed it will be obvious that crystalline structures may be examined in the manner as described by using the combination with microscopes of greater magnification if desired. Further, crystal forms other than wax may be examined and other advantages may be obtained by adaptation to many and varied usages with such modification as may be interpreted within the scope of the appended claims.

I claim:

1. In combination with a microscope having a condenser lens and an analyzer aligned on an optical axis: a centrally apertured opaque annular diaphragm, an annular transparent non-polarizing color filter having a central aperture and concentric with said opaque annular diaphragm, the effective area of said annular color filter being contiguous to said opaque annular diaphragm, and light polarizing means aligned on said optical axis with the central aperture of said opaque annular diaphragm, the effective area of said light polarizing means being coextensive with the central aperture of said opaque diaphragm and out of register with the effective area of said annular color filter, said light polarizing means and the central apertures of said opaque annular diaphragm and of said annular color filter being aligned on said optical axis, said condenser lens being positioned intermediate said analyzer on the one hand and said opaque annular diaphragm, annular color filter and light polarizing means on the other hand; whereby polarized and colored non-polarized light are separately and simultaneously transmitted through said condenser lens onto a dark field and whereby optically active and inactive material may be simultaneously observed through said analyzer in said dark field.

2. In combination with a microscope having a condenser lens and an analyzer aligned on an optical axis: a centrally apertured opaque annular diaphragm and a centrally apertured annular transparent non-polarizing color filter surrounding said diaphragm, the effective area of said annular color filter being contiguous to the outer periphery of said opaque annular diaphragm, and light polarizing means aligned on said optical axis with the central aperture of said opaque annular diaphragm, the effective area of said light polarizing means being coextensive with the central aperture of said opaque diaphragm and out of register with the effective area of said annular color filter, said light polarizing means and the central apertures of said opaque annular diaphragm and of said annular color filter being aligned on said optical axis, said condenser lens being positioned intermediate said analyzer on the one hand and said opaque annular diaphragm, annular color filter and light polarizing means on the other hand; whereby polarized and colored non-polarized light are separately and simultaneously transmitted through said condenser lens onto a dark field and whereby optically active and inactive material may be simultaneously observed through said analyzer in said dark field.

KARL A. FISCHER.

REFERENCES CITED

The following references are of record in the file of this patent:

UNITED STATES PATENTS

| Number | Name | Date |
|---|---|---|
| 2,083,820 | Bissell | June 15, 1937 |
| 2,105,671 | Roesch | Jan. 18, 1938 |
| 2,130,493 | Heine | Sept. 20, 1938 |
| 2,182,499 | Ott | Dec. 5, 1939 |
| 2,192,295 | Berek | Mar. 5, 1940 |
| 2,351,736 | Benford | June 20, 1944 |

FOREIGN PATENTS

| Number | Country | Date |
|---|---|---|
| 476,023 | Great Britain | Nov. 30, 1937 |
| 883,656 | France | Mar. 29, 1943 |